Patented Jan. 9, 1951

2,537,448

UNITED STATES PATENT OFFICE 2,537,448

PROCESS FOR PURIFYING GASES

Willem Frederik Engel, Amsterdam, Netherlands, assignor to Shell Development Company, San Francisco, Calif., a corporation of Delaware No Drawing. Application April 22, 1947, Serial No. 743,187. In the Netherlands May 22, 1946

10 Claims. (Cl. 23—3)

This invention relates to the purification of normally gaseous materials of relatively high thermal stability. The invention relates more particularly to the removal of organically combined halogen and/or sulfur from normally gaseous materials comprising an oxide of carbon and hydrogen. A particular aspect of the invention relates to the removal of impurities comprising organically combined chlorine and/or sulfur from gases consisting essentially of carbon monoxide and hydrogen.

The efficient, large scale utilization of normally gaseous materials of relatively high thermal stability as starting or intermediate materials in the production of valuable derivatives thereof, or as fuels, is often seriously handicapped by the admixture therewith of contaminant materials. The presence of even relatively small amounts of halogen- or sulfur-containing impurities in gases such as those comprising an oxide of carbon and/or hydrogen in substantial amounts, materially detracts from the suitability of these materials in fields of application in which they are efficiently employed when free of such contaminants. Thus, the poisoning effect of these impurities upon the catalytic activity of many catalyst components such as, for example, many of the metals, renders the gases comprising them unsuited as charge to processes employing such catalytic materials. Since many of the readily available normally gaseous materials such as, for example, gases comprising substantial amounts of oxides of carbon and/or hydrogen, often contain sulfur and/or halogen in contaminating amounts, the practical operation of many processes relying upon such gases as starting or intermediate materials is generally dependent upon a method enabling efficient removal of such contaminants.

Processes available heretofore enabling the removal to at least a substantial degree of such impurities from gases comprising them are often handicapped by the need for operative steps, the complexity of which and/or the expense of the apparatus thereby necessitated, renders such processes impractical as a source of a sufficiently pure gaseous material in many fields of application. Many other purifying processes, although of a less complex nature, generally employ catalytic materials which, because of such factors as a relatively high initial cost, short useful life, difficulty with which they are reactivated, and the like, render their use impractical. Still other treating methods are handicapped by the additional operative steps they occasion. Thus purification steps requiring the use of water, whether in the form of a liquid or steam, generally necessitate the use of additional water separating steps and/or dehydrating steps which often militate against the practicability of the process. A particularly disadvantageous feature of many less costly processes available heretofore is their inability to effect any substantial removal of the contaminants without also altering to a material extent the composition of the gases or gaseous mixtures treated. This is generally particularly so when the halogen and/or sulfur contaminants are present in organically combined form, such as in the form of cyclic sulfur compounds containing sulfur in the ring, as thiophene, or in the form of aromatic chlorine compounds, as chlortoluene and the like.

A prerequisite to especial suitability of a process effecting efficient removal of the contaminants from gases, particularly from a gaseous mixture the composition of which has been adjusted in conformity with requirements prescribed by the operating conditions of the process in which it is to be employed as starting materials, is the ability to avoid not only any substantial alteration in the chemical composition, but also any material alteration in the percentage composition of the gases or gaseous mixtures treated.

It is an object of the present invention to provide an improved process enabling the more efficient purification of normally gaseous materials of relatively high thermal stability without effecting any substantial alteration in the composition thereof.

Another object of the present invention is the provision of an improved process enabling the more efficient removal of impurities comprising halogen and/or sulfur from normally gaseous materials of relatively high thermal stability, such as gases comprising substantial amounts of an oxide of carbon and/or hydrogen without effecting any substantial alteration in the composition of the gases treated.

Another object of the invention is the provision of an improved process enabling the more efficient removal of contaminating amounts of organically combined chlorine and/or sulfur from normally gaseous materials comprising substantial amounts of an oxide of carbon and/or hydrogen without altering to any substantial degree the composition of the gases treated.

A still further object of the invention is the provision of an improved process enabling the more efficient removal of organically combined chlorine from normally gaseous materials comprising carbon monoxides and/or hydrogen without any substantial alteration in the composition of the gases treated.

Still another object of the invention is the provision of an improved process enabling the more efficient removal of organically combined sulfur from normally gaseous materials comprising substantial amounts of carbon monoxide and/or hydrogen without effecting any substantial change in the composition of the gases treated.

A particular object of the invention is the provision of an improved process enabling the more efficient removal of organically combined impurities comprising organically combined chlorine and/or sulfur from normally gaseous materials comprising carbon monoxide and hydrogen suitable for the synthesis of hydrocarbons, without effecting any substantial change in the composition of said gases. Other objects and advantages of the invention will become apparent from the following detailed description thereof.

It has now been found that contaminating amounts of impurities comprising halogen and/or sulfur, such as, for example, organically combined halogen and/or sulfur, are removed substantially completely from normally gaseous materials of relatively high thermal stability, such as, for example, gases comprising an oxide of carbon and/or hydrogen, comprising them, without bringing about any substantial alteration in the chemical or physical composition of the gases treated, by contacting the gases comprising such contaminants under substantially anhydrous conditions with a catalyst comprising active carbon in combination with an alkaline compound of an alkali and/or alkaline earth metal at a temperature in excess of about 475° C., but below the temperature at which any substantial decomposition and/or reaction of the components of the gases treated, other than the contaminants, are encountered.

The process of the invention is applied, broadly, to the treatment of any normally gaseous material of relatively high thermal stability. Thus the process is employed to effect the removal of contaminants comprising halogen and/or sulfur from gases such as, for example, those containing a substantial amount of hydrogen and/or an oxide of carbon such as carbon monoxide and/or carbon dioxide. Examples of gases treated in accordance with the process of the invention are coal gas, fuel gas, coke-oven gas, producer gas, gases produced by thermal distillation or treatment with a gasifying agent of carbonaceous materials such as coke, coal, peat, peat-coke, petroleum-coke and the like. The process of the invention lends itself with particular advantage to the treatment of gaseous materials comprising substantial amounts of carbon monoxide and hydrogen obtained from any suitable source. Thus carbon monoxide- and hydrogen-containing gases may be obtained by partial oxidation of hydrocarbons, the oxidation of methane with carbon dioxide, conversion of hydrocarbons with steam, etc. A particular advantage of the process resides in the ability to remove efficiently contaminants comprising chlorine and/or sulfur from gases comprising carbon monoxide and hydrogen in relative proportions suitable for use in the synthesis of hydrocarbons without effecting any substantial change in the ratio of hydrogen to carbon monoxide.

Further examples of gases freed of contaminants comprising halogen and sulfur in accordance with the invention include such gases as nitrogen, hydrogen, carbon dioxide, etc. The gases treated in accordance with the invention may contain substantial amounts of, or even consist predominantly of, certain hydrocarbons of high thermal stability such as, for example, the normally gaseous paraffins, as methane. Less thermally stable hydrocarbons such as, for example, the normally liquid hydrocarbons comprised in the motor fuel boiling range are, however, freed of contaminating amounts of halogen and sulfur at the more temperate conditions described and claimed in copending application Serial No. 751,948, filed June 2, 1947, which matured into Patent No. 2,481,300.

The efficiency and relatively low cost of the process renders its use particularly effective in the purification of gases to be used as charge or diluent material, etc., in such processes as hydrocarbon synthesis, hydrogenation, dehydrogenation and the like in which catalysts are employed which are adversely effected by contact with even relatively small amounts of a halogen- or sulfur-containing impurity. Examples of such catalysts are those comprising a metal such as nickel, iron, cobalt, chromium, palladium and the like as active component.

The process of the invention is executed in the presence of a catalyst comprising adsorptive carbon and an alkaline compound of an alkali and/or alkaline earth metal. Attainment of the objects of the invention necessitates the utilization in combination with one another of both components. The active carbon component of the catalyst may consist of any suitable carbon having an extended surface area. Particularly preferred active carbons are the highly adsorptive carbons possessing a suitable hardness. The active carbons are not limited to those of any particular source and comprise, for example, activated vegetable or animal charcoals such as the cocoanut charcoals, wood charcoals, peach pit charcoals, bone-charcoals, etc., as prepared and activated by various commercial suppliers. The charcoal may be further activated prior to, or during, preparation of the combination catalyst by such treatment as subjection to steam or mineral acids, etc.

Suitable alkaline compounds employed in combination with the active carbon comprise the alkaline compounds of the alkali and/or alkaline earth metals, such as, for example, the oxides, hydroxides, carbonates, and bicarbonates of one or more of the following: sodium, potassium, calcium, barium, strontium, lithium, rubidium and cesium. Of these compounds the oxides, hydroxides and carbonates of sodium, potassium and calcium are somewhat preferred. Particularly preferred catalysts comprise active carbon in combination with an alkali metal hydroxide, such as potassium hydroxide and/or sodium hydroxide.

The combination catalysts may be employed in the form of a simple mechanical mixture of the alkaline compound and the active carbon as obtained, for example, by mixing the carbon with the alkaline compound in the form of powder, pellets, chunks, pieces or the like. It is preferred, however, to absorb at least a substantial amount of the alkaline compound into the surface of the active carbon. Such preferred catalysts may be obtained by formation of the alkaline compound upon the active carbon and subsequently heating the combination at an elevated temperature, or by adding the alkaline compound in finely divided form to the active carbon under conditions conducive to penetration of the pores of the active carbon. Such adsorption in the dry state may be brought about, for example, by the addition of the finely divided alkaline compound to the carbon while under reduced pressure and thereafter raising the pressure. It is to be stressed, however, that the invention is in no wise limited by the manner in which the active carbon is combined with the alkaline compound. The ratio of carbon to alkaline compound in the combination catalysts employed may vary widely within the scope of the invention. In general, it is preferred to employ a catalyst mixture containing a greater amount, by weight of active carbon than alkaline compound admixed therewith. Suitable catalysts, however, comprise, for example, mixtures of active carbon and alkaline compounds of the above-defined class which contain from about 5 to about 40%, and preferably from about 10 to about 30%, by weight, of the carbon of alkali and/or alkaline earth metal, in the form of the alkaline compound, or compounds.

In executing the process of the invention, the gases to be purified are contacted in the vapor phase with the catalyst at a temperature in excess of about 475° C. The maximum permissible temperature will vary with the thermal stability of the particular gas or gaseous mixture charged. Thus the temperature of operation is maintained at all times below the temperature at which any substantial alteration in composition of the gas or gaseous mixture treated, due to decomposition or reaction of components other than the contaminants, is encountered. Thus temperatures in the range of, for example, from about 475° C. to about 700° C., and preferably from about 500° C. to about 650° C. are employed to effect the removal of chlorine- and/or sulfur-containing contaminants from gaseous materials comprising an oxide of carbon and/or hydrogen, such as, for example, the synthesis gases to be employed as charge to a process synthesizing hydrocarbons. Atmospheric, sub-atmospheric and super-atmospheric pressures may be employed.

The rate of throughput employed will also vary within the scope of the invention and will depend to some extent upon the amount and nature of contaminants present, as well as upon the temperature employed and the degree of thermal stability of the gases treated.

The gases treated may be contacted with the combination catalyst in any suitable type of reactor, or series of reactors, enabling intimate contact of the gases with the catalysts. Reaction zones wherein the catalyst is in the form of a fixed bed, moving bed, or a fluidized or suspended mass, while in contact with the gases undergoing treatment may be employed.

It has been found that under the above-defined conditions, impurities comprising halogen and/or sulfur are removed efficiently from the gases comprising them as contaminants. Efficient removal of the impurities even when present in organically combined form such as, for example, in the form of aromatic halogen, as chlorbenzene; or in the form of cyclic sulfur compounds, as thiophene, is attained. It is to be stressed that removal of the impurities with such a degree of efficiency is in no wise obtained by the use of either the active carbon or the alkaline compounds alone. The effect of the combination catalyst is in no wise an additive effect. The resulting purified products are free of any substantial amount of halogen and/or sulfur contaminants and in general will need no further sulfur or halogen removal treatment; impurities comprising halogen and/or sulfur being retained in the catalyst mass. Without intending to limit the scope of the invention by any theory advanced herein to set forth more fully the nature of the invention, it is believed that the compounds comprising the organically combined halogen and/or sulfur are decomposed during the purifying operation and the resulting halogen and/or sulfur decomposition products retained by the catalyst components by reaction and/or adsorption therewith.

The impurities retained by the catalyst are readily removed therefrom by steaming at an elevated temperature, for example, at a temperature in the range of from about 400° C. to about 500° C. In a preferred method of operation at least two reactors are employed. At least one reactor is employed in the gas purification operation while removal of halogen and/or sulfur, for example by steaming, from used catalyst is effected in at least one other reactor. In such wise efficient, continuous, uninterrupted operation of the treating process is assured. Halogen and/or sulfur obtained from the spent catalyst is recovered as by-product or passed directly to a separate process employing it as a charge material.

When the catalysts become exhausted to a point where efficient impurity removal is no longer obtained, they are subjected to a more drastic regeneration. Such more acute catalyst exhaustion, not completely remedied by mere steaming or gas blowing, is obtained particularly when effecting the removal of organically combined halogen, such as organically combined chlorine, from the gases undergoing treatment. Such exhaustion of the catalyst may well be due to interaction of decomposition products of organically combined halogen compounds, such as, for example, hydrogen halide, or free halogen, with the alkali or alkaline earth metal of the alkaline compound in the catalyst to result in the formation of a halide salt of the alkali or alkaline earth metal. Regeneration of the exhausted catalyst is readily brought about by washing the spent catalyst with water, thereby effecting the removal of at least a substantial part of the resulting halide salts, and thereafter combining fresh alkaline alkali or alkaline earth compounds with the washed carbon.

A particular advantage of the invention resides in the ability to produce a product containing no substantial amounts of hydrogen halide and/or hydrogen sulfide, thereby obviating the need for subsequent washing of the treated product. A further advantage resides in the ability to effect the removal of the impurities without recourse to the use of water or steam during the purifying operation, thereby obviating the need for separation of water from the product or subjection of the product to a dehydration step. After prolonged periods of operation when the catalyst begins to lose its ability to retain substantially completely the sulfur- and/or halogen-containing products resulting from decomposition of the contaminants, an after-treatment of the gas to effect the removal of remaining minor amounts of impurities, such as hydrogen sulfide, by means of a treatment with aqueous caustic solutions, with an organic amine or a solid adsorbent, may be resorted to.

The following examples are illustrative of the method of purification of normally gaseous materials in accordance with the process of the invention.

Example I

Thiophene was added to a coal gas having a sulfur content of 97 mg. of sulfur per cubic meter of gas to bring the total sulfur content thereof to 263 mg. per cubic meter. No reduction in sulfur content was obtained by treating the sulfur-containing gas with caustic. A catalyst was prepared by impregnating active carbon with sufficient potassium hydroxide to obtain an active carbon-potassium hydroxide mixture having a potassium content of 30% by weight. The gas enriched with the added thiophene was passed over the catalyst thus prepared at a temperature of 550° C. atmospheric pressure and a throughput rate of 40 liters of the gas, per liter of catalyst, per hour. Samples taken periodically over a 50-hour period of continuous operation, indicated an average sulfur content of only 5.5 mg. of sulfur per cubic meter of treated gas. No substantial change in composition of the gas other than the sulfur removal was observed.

Example II

Coal gas enriched with added thiophene to the total sulfur content indicated in Example I, was passed over another portion of the active carbon-KOH catalyst of Example I. The conditions employed were those set forth in Example I with the exception that the operating temperature was maintained at 500° C. during the first ten hours of continuous operation and the average sulfur content of the purified gas amounted to only 9 mg. of sulfur per cubic meter of gas. Thereafter the sulfur content of the treated gas was somewhat higher, resulting in the obtaining of an overall average sulfur content of 25 mg. of sulfur per cubic meter of gas for 15 hours of continuous operation.

Example III

A mixture of carbon monoxide and hydrogen containing about 2 volumes of hydrogen per volume of carbon monoxide, and having a sulfur content of 120 mg. of sulfur per cubic meter of gas, and a chlorine content of 10 mg. per cubic meter of gas, was purified by contact with a catalyst consisting of active carbon and potassium hydroxide, at a temperature of 550° C. atmospheric pressure, and a throughput rate of 40 liters of gas per liter of catalyst per hour. The sulfur in the untreated gaseous charge was present as organically combined sulfur, and the chlorine was present in the form of organically combined chlorine. The sulfur and chlorine content of the gas prior to treatment was found to be unaffected by treatment with caustic. The catalyst employed had a potassium content of 30% by weight. The purified gas obtained during a 20-hour period of continuous operation was found to have an average overall sulfur content of only 2 mg., and an average overall chlorine content of only 1 mg. per cubic meter of gas.

The invention claimed is:

1. The process of removing organically combined chlorine from normally gaseous materials of relatively high thermal stability comprising carbon monoxide and hydrogen which comprises contacting said normally gaseous materials at a temperature above about 475° C. but below the temperature at which any substantial alteration in composition of said normally gaseous materials is brought about, with a catalyst consisting essentially of active carbon in combination with potassium hydroxide thereby retaining said chlorine in said catalyst and recovering said normally gaseous materials free of any substantial amount of said chlorine.

2. The process of removing organically combined chlorine from normally gaseous materials of relatively high thermal stability comprising carbon monoxide and hydrogen which comprises contacting said normally gaseous materials at a temperature above about 475° C., but below the temperature at which any substantial alteration in composition of said normally gaseous materials is encountered, with a catalyst consisting essentially of active carbon in combination with an alkali metal hydroxide thereby retaining said chlorine in said catalyst and recovering said normally gaseous materials free of any substantial amount of said chlorine.

3. The process of removing organically combined chlorine from normally gaseous materials of relatively high thermal stability comprising carbon monoxide and hydrogen which comprises contacting said normally gaseous materials at a temperature above about 475° C., but below the temperature at which any substantial alteration in composition of said normally gaseous materials is brought about, with a catalyst consisting essentially of active carbon in combination with an alkaline compound of an alkali metal thereby retaining said chlorine in said catalyst and recovering said normally gaseous materials free of any substantial amount of said chlorine.

4. The process of removing organically combined sulfur from normally gaseous materials of relatively high thermal stability comprising carbon monoxide and hydrogen which comprises contacting said normally gaseous materials at a temperature above about 475° C., but below the temperature at which any substantial alteration in composition of said normally gaseous materials is encountered, with a catalyst consisting essentially of active carbon in combination with potassium hydroxide thereby retaining said sulfur in said catalyst and recovering said normally gaseous materials free of any substantial amount of said sulfur.

5. The process of removing organically combined sulfur from normally gaseous materials of relatively high thermal stability comprising carbon monoxide and hydrogen which comprises contacting said normally gaseous materials at a temperature above about 475° C., but below the temperature at which any substantial alteration in composition of said normally gaseous materials is brought about, with a catalyst consisting essentially of active carbon in combination with an alkali metal hydroxide thereby retaining said sulfur in said catalyst and recovering said normally gaseous materials free of any substantial amount of sulfur.

6. The process of removing organically combined sulfur from normally gaseous materials of relatively high thermal stability comprising carbon monoxide and hydrogen which comprises contacting said normally gaseous materials at a temperature above about 475° C., but below the temperature at which any substantial alteration in composition of said normally gaseous materials is encountered, with a catalyst consisting essentially of active carbon in combination with an alkaline compound of an alkali metal thereby retaining said sulfur in said catalyst and recovering said normally gaseous materials substantially free of sulfur.

7. The process of removing organically combined chlorine from normally gaseous materials of relatively high thermal stability comprising an oxide of carbon and hydrogen, which comprises contacting said normally gaseous materials at a temperature above about 475° C., but below the temperature at which any substantial alteration in composition of said normally gaseous materials is brought about, with a catalyst consisting essentially of active carbon in combination with an alkaline compound of an alkali metal, thereby retaining said chlorine in said catalyst and recovering said normally gaseous materials free of any substantial amount of said chlorine.

8. The process of removing organically combined halogen from normally gaseous materials of relatively high thermal stability comprising an oxide of carbon and hydrogen, which comprises contacting said normally gaseous materials at a temperature above about 475° C., but below the temperature at which any substantial alteration in composition of said normally gaseous materials is brought about, with a catalyst consisting essentially of active carbon in combination with an alkaline compound of an alkali metal, thereby retaining said halogen in said catalyst and recovering said normally gaseous materials free of any substantial amount of said halogen.

9. The process of removing organically combined sulfur from normally gaseous materials of relatively high thermal stability comprising an oxide of carbon and hydrogen, which comprises contacting said normally gaseous materials at a temperature above about 475° C., but below the temperature at which any substantial alteration in composition of said normally gaseous materials is encountered, with a catalyst consisting essentially of active carbon in combination with an alkaline compound of an alkali metal, thereby retaining said sulfur in said catalyst and recovering said normally gaseous materials free of any substantial amount of sulfur.

10. The process of removing impurities of the group consisting of organically combined halogen and organically combined sulfur from normally gaseous materials of relatively high thermal stability comprising an oxide of carbon and hydrogen which comprises contacting said normally gaseous materials at a temperature above about 475° C., but below the temperature at which any substantial alteration in composition of said normally gaseous materials is encountered, with a catalyst consisting essentially of active carbon in combination with an alkaline compound of an alkali metal, thereby retaining said impurities in said catalyst and recovering said normally gaseous materials free of any substantial amount of said impurities.

WILLEM FREDERIK ENGEL.

REFERENCES CITED

The following references are of record in the file of this patent:

UNITED STATES PATENTS

| Number | Name | Date |
|---|---|---|
| 1,976,806 | Rosen et al. | Oct. 16, 1934 |
| 2,168,933 | Giller et al. | Aug. 8, 1939 |

FOREIGN PATENTS

| Number | Country | Date |
|---|---|---|
| 2,345 | Great Britain | of 1855 |
| 180,024 | Great Britain | May 15, 1922 |
| 478,877 | Great Britain | Jan. 21, 1938 |

OTHER REFERENCES

Mellor, "Treatise on Inorganic and Theoretical Chemistry," vol. 5 (1924) page 927.

Lange, "Handbook of Chemistry," 5th ed. (1944) Handbook Publishers, Inc., Sandusky, Ohio, page 858.